US012784726B2

(12) United States Patent
Weber et al.

(10) Patent No.: US 12,784,726 B2
(45) Date of Patent: Nov. 3, 2026

(54) SOUND COMPENSATION APPARATUS, VEHICLE, METHOD FOR SOUND COMPENSATION AND METHOD FOR SOUND EMISSION

(71) Applicant: Vitesco Technologies GmbH, Regensburg (DE)

(72) Inventors: Rainer Weber, Regensburg (DE); Gerhard Eser, Hemau (DE)

(73) Assignee: Vitesco Technologies GmbH, Regensberg (DE)

( * ) Notice: Subject to any disclaimer, the term of this patent is extended or adjusted under 35 U.S.C. 154(b) by 187 days.

(21) Appl. No.: 18/212,305

(22) Filed: Jun. 21, 2023

(65) Prior Publication Data

US 2023/0419940 A1 Dec. 28, 2023

(30) Foreign Application Priority Data

Jun. 22, 2022 (DE) ..................... 10 2022 206 211.6

(51) Int. Cl.
*G10K 11/175* (2006.01)
*B60H 1/00* (2006.01)
(Continued)

(52) U.S. Cl.
CPC ............ *G10K 11/175* (2013.01); *B60Q 5/005* (2013.01); *G10K 11/161* (2013.01); *H02K 9/19* (2013.01); *B60H 2001/006* (2013.01)

(58) Field of Classification Search
CPC ............... G10K 11/175; G10K 11/161; G10K 2210/1054; G10K 2210/1282; G10K 11/17857; G10K 11/17875; G10K 11/17873; G10K 11/17823; G10K 2210/109; G10K 2210/112; G10K 2210/121; G10K 2210/3214; G10K 11/17817; G10K 11/17821;
(Continued)

(56) References Cited

U.S. PATENT DOCUMENTS 3,312,107 A * 4/1967 Burns ................... G01F 23/284
331/65
4,490,841 A * 12/1984 Chaplin ........... G10K 11/17881
381/71.13

(Continued)

FOREIGN PATENT DOCUMENTS

CN 101535659 9/2009
CN 209560464 10/2019

(Continued)

OTHER PUBLICATIONS

Office Action of corresponding German Patent Application No. 10 2022 206 211.6.

(Continued)

*Primary Examiner* — Jeremy A Luks
(74) *Attorney, Agent, or Firm* — COZEN O'CONNOR

(57) ABSTRACT

A sound compensation apparatus having a working fluid circuit for cooling by a working fluid, a vehicle having such a sound compensation apparatus, a method for sound compensation, and to a method for sound emission. The sound compensation apparatus includes a vibration actuator designed to at least partially compensate for sound waves in the working fluid. The invention also relates to.

17 Claims, 3 Drawing Sheets

(51) Int. Cl.
*B60Q 5/00* (2006.01)
*G10K 11/16* (2006.01)
*H02K 9/19* (2006.01)

(58) Field of Classification Search
CPC ......... G10K 11/17825; G10K 11/1783; G10K 11/17853; G10K 11/17881; G10K 11/17883; G10K 11/17885; G10K 2210/101; G10K 2210/105; G10K 2210/107; G10K 2210/128; G10K 2210/129; G10K 2210/3011; G10K 2210/3031; G10K 2210/3033; G10K 2210/3212; G10K 2210/3217; G10K 2210/3229; G01H 11/08; B60Q 5/005; B60Q 5/008; B60H 2001/006; B60H 1/00571; B06B 1/06; B06B 3/00; B06B 2201/55; B06B 2201/75; H02K 9/19; H02K 2213/09; H02K 11/20; G01F 23/296; G01F 23/2966; B60K 1/02; B60K 2006/4825
See application file for complete search history.

(56) References Cited

U.S. PATENT DOCUMENTS 4,599,892 A * 7/1986 Doshi .................. G01F 23/296 73/149
4,726,245 A * 2/1988 Klaue .................. F16H 37/042 74/336 R
4,878,188 A * 10/1989 Ziegler, Jr. ......... H03H 21/0012 381/71.11
5,347,870 A * 9/1994 Dosch ..................... G01B 7/00 310/319
7,114,384 B1 * 10/2006 Bates ..................... G01F 17/00 73/290 V
7,926,341 B2 4/2011 Boudaoud et al.
8,140,230 B2 * 3/2012 Haggerty .............. B60W 10/06 123/192.1
8,186,394 B2 5/2012 Nourdine et al.
8,256,849 B2 9/2012 Kokubo
9,206,717 B2 * 12/2015 Krüger ................ F01N 13/1888
9,243,543 B2 * 1/2016 Bertrand ................. F01N 13/08
10,137,883 B2 11/2018 Chung
10,634,545 B2 * 4/2020 Boström ............. G01F 23/2962
11,150,123 B2 10/2021 Tenckhoff
2002/0071571 A1 6/2002 Veen et al.
2022/0093077 A1 3/2022 Starobin et al.

FOREIGN PATENT DOCUMENTS

DE 69117571 * 10/1996
DE 102009057981 6/2011
DE 102009057981 A1 * 6/2011
DE 102010043212 5/2012
DE 102012025584 4/2014
DE 102018222339 6/2020
DE 102019124199 3/2021
DE 102020209582 2/2022
EP 3269575 1/2018
FR 2891621 8/2007
JP 2007017320 1/2007
WO WO 9217936 10/1992
WO WO 2005100928 10/2005

OTHER PUBLICATIONS

Office Action German Patent Application No. DE 102022005108.7, dated Oct. 2, 2024.
Office Action of corresponding Chinese Patent Application No. 202310741960.2, dated Jul. 29, 2025.

* cited by examiner

SOUND COMPENSATION APPARATUS, VEHICLE, METHOD FOR SOUND COMPENSATION AND METHOD FOR SOUND EMISSION

BACKGROUND OF INVENTION

1. Field of the Invention

The disclosure relates to a sound compensation apparatus and to a vehicle having such a sound compensation apparatus. The disclosure also relates to a method for sound compensation by such a sound compensation apparatus or such a vehicle. The disclosure additionally relates to a method for sound emission by such a sound compensation apparatus or such a vehicle.

2. Description of Related Art

The document EP 3 269 575 A1 relates to an active vibration reduction control apparatus for a hybrid vehicle.

The document DE 10 2010 043 212 A1 relates to an apparatus for identifying road users and to a system for transmitting a warning signal in the direction of potentially endangered road users.

A disadvantage of the apparatuses in the prior art is their complex and expensive design.

SUMMARY OF THE INVENTION

An object of one aspect of the present invention is an alternative sound compensation apparatus that is distinguished in particular by its inexpensiveness, its versatility, and/or its simple producibility. A further aspect consists in providing a vehicle having such a sound compensation apparatus. Furthermore, a further aspect consists in providing a method for sound compensation. Additionally, a further aspect consists in providing a method for sound emission.

One aspect of the invention relates to a sound compensation apparatus having a working fluid circuit for cooling by a working fluid, wherein the sound compensation apparatus comprises a vibration actuator designed to at least partially compensate for sound waves in the working fluid of the working fluid circuit. This reliably reduces undesirable and perturbing sound emissions that propagate in the working fluid of the working fluid circuit.

In other words, the compensation means reduction or elimination of the sound waves. In other words, the sound compensation apparatus can thus be referred to as a sound reduction apparatus or as a sound elimination apparatus.

The working fluid is preferably a working liquid. If the working fluid is a working liquid, a working liquid circuit is preferably involved. It is particularly expedient if the working fluid or the working liquid is a coolant or a refrigerant. If the working fluid or the working liquid is a coolant, it is preferred for the working fluid circuit or the working liquid circuit to be a coolant circuit. If the working fluid or the working liquid is a refrigerant, the working fluid circuit or the working liquid circuit is a refrigerant circuit. All of the aspects mentioned hereinabove and disclosed hereinbelow relate to the embodiments containing the working fluid, the working liquid, the coolant, the refrigerant, the working fluid circuit, the working liquid circuit, the coolant circuit and the refrigerant circuit, and also to the working fluid circuit section, the working liquid circuit section, the coolant circuit section and the refrigerant circuit section that are mentioned later. The same applies to a working fluid container.

One aspect of the invention comprises a sound compensation apparatus having a refrigerant circuit for cooling by a refrigerant, wherein the sound compensation apparatus comprises a vibration actuator designed to at least partially compensate for sound waves in the refrigerant of the refrigerant circuit.

A further aspect of the invention also comprises a sound compensation apparatus having a coolant circuit for cooling by a coolant, wherein the sound compensation apparatus comprises a vibration actuator designed to at least partially compensate for sound waves in the coolant of the coolant circuit.

One aspect of the invention is preferably characterized in that the sound compensation apparatus is provided having an electric machine. A further aspect of the invention relates to the circumstance that the sound waves to be compensated for in the working fluid are caused or can be caused by the operation of the electric machine.

It is also preferable if the electric machine is an electric motor, a starter generator, an alternator or a power generator. A suitable electric motor in this case is preferably a permanent-field synchronous machine on account of its high power density. Alternatively, however, electric motors that are in the form of asynchronous machines, separately excited electric motors, in particular separately excited synchronous motors, or axial flux machines are also conceivable.

In addition, it is advantageous if the electric motor is a traction motor, in other words a drive motor for a vehicle, for example as part of an electrical drive axle. In particular, the operation of the electric motor, in particular if said electric motor is in the form of a traction motor, leads to the generation of sound waves in the coolant.

Alternatively, it is preferred if the electric motor is part of an electrically driven air conditioning compressor. The air conditioning compressor of this kind is therefore driven, or can be driven, in particular by the electric motor. The air conditioning compressor is preferably a scroll compressor or a swash plate compressor. Alternatively, it is preferably a mechanically driven or mechanically driveable air conditioning compressor. Such an air conditioning compressor can be driven, or is driven, for example by an internal combustion engine of a vehicle by a belt or chain drive. In particular, the air conditioning compressor is fundamentally designed to convey the refrigerant through the refrigerant circuit. The embodiments with the air conditioning compressor relate in particular to the sound compensation apparatus for compensating for sound waves in the refrigerant. In particular, the conveyance by the air conditioning compressor or the operation of the internal combustion engine leads to the generation of the sound waves to be compensated for in the refrigerant.

Alternatively, it is advantageous if the electric motor is part of a coolant pump. The coolant pump of this kind is therefore driven, or can be driven, by the electric motor. Alternatively, it is preferred for the coolant pump to be a mechanically driven or mechanically driveable coolant pump. Such a coolant pump can be driven, or is driven, for example by an internal combustion engine by a belt or chain drive. In particular, the coolant pump is fundamentally designed to convey the coolant through the coolant circuit. In particular, the conveyance by the coolant pump or the operation of the internal combustion engine leads to the generation of sound waves in the coolant.

It is also preferred if the sound compensation apparatus is provided having multiple electric machines or electric motors. By way of example, one of the multiple electric motors forms the aforementioned traction motor, while the other two electric motors or two of the multiple electric motors are each part of the coolant pump and the air conditioning compressor. Alternatively, it is also possible for the sound compensation apparatus to be provided having just or at least two electric motors. In this case, one of the two electric motors forms the traction motor, while the other electric motor is part of the coolant pump or the air conditioning compressor.

One of the previous exemplary embodiments or a further exemplary embodiment is preferably characterized in that the working fluid circuit comprises at least one working fluid circuit section designed to cool a battery, a battery housing, an electric machine, the electric machine, an electric motor, the electric motor, an inverter, power electronics and/or a battery charging system. In accordance with the design of the at least one working fluid circuit section, the sound compensation apparatus is preferably provided having a battery, a battery housing, an inverter, at least one electric machine, at least one electric motor, power electronics and/or a battery charging system. It is preferred for at least one working fluid circuit section to be coupled to the unit to be cooled, for example the battery charging system, electric motor, etc., for heat transfer purposes.

One of the previous exemplary embodiments or a further exemplary embodiment is preferably characterized in that the electric machine comprises a cooling jacket that forms a working fluid circuit section of the working fluid circuit. In other words, the cooling circuit is used to cool the electric machine. Even irrespective of whether the electric machine comprises a cooling jacket that forms a working fluid circuit section of the working fluid circuit, it is preferred for the cooling circuit to be coupled to the electric machine for heat transfer purposes. In other words, it is preferred if the cooling circuit is designed to cool the electric machine.

One of the previous exemplary embodiments or a further exemplary embodiment is preferably characterized in that the working fluid circuit comprises an equalizing container for the working fluid and/or a working fluid container and in that the vibration actuator is coupled to the equalizing container or to the working fluid container.

In addition, it is advantageous if the equalizing container and/or the working fluid container is in the form of a resonating body for the vibration actuator. This allows sound waves to be generated with as little expenditure of energy as possible. The resonant frequency of the equalizing container is dependent on the material thereof, the dimensions thereof and the fill level of the working fluid inside the equalizing container.

It is also preferable if the coupling of the vibration actuator to the equalizing container is a coupling that can transmit vibrations. Alternatively or additionally, it is advantageous if the vibration actuator is mounted on the equalizing container. For this purpose, it is expedient to provide for cohesive, force-fit and/or form-fit mounting. It is particularly preferred if the vibration actuator comprises a housing made from plastic and the equalizing container is likewise produced from plastic, the housing and the equalizing container being welded together and this producing the mounting of the vibration actuator on the equalizing container. The vibration actuator is preferably mounted directly on the equalizing container.

It is also expedient if the vibration actuator is arranged inside or outside the equalizing container. An arrangement outside the equalizing container has the advantage that the vibration actuator is protected from the working fluid that is in the equalizing container.

In addition, it is advantageous if the vibration actuator is mounted, or can be mounted, on a periphery of the sound compensation apparatus and is coupled to the equalizing container for vibration transmission purposes. Such a periphery can be understood to mean for example a support that is arranged without contact with or at a distance from the equalizing container. It is furthermore expedient if the vibration actuator is prestressed in the direction of the equalizing container, that is to say against the equalizing container.

Alternatively, it is preferred if the vibration actuator is arranged on a working fluid connection. The vibration actuator is preferably coupled directly to the working fluid connection, in particular mounted and/or coupled for vibration transmission purposes. The working fluid connection is preferably a working fluid connection of a battery, a battery housing, an inverter, an electric machine, the electric machine, an electric motor, power electronics and/or a battery charging system. The vibration actuator is thus arranged in direct proximity to the apparatus causing sound waves in the working fluid. This prevents propagation in the working fluid at the source.

One of the previous exemplary embodiments or a further exemplary embodiment is preferably characterized in that the vibration actuator is in the form of an electromechanical vibration actuator.

It is also preferable if the vibration actuator is in the form of a piezoelectric vibration actuator. This provides an actuator of particularly small dimensions.

In addition, it is advantageous if the vibration actuator comprises a vibrating body, in particular an oscillating piston, that is accommodated in the vibration actuator in a mobile, in particular spring-loaded, fashion. The vibrating body is preferably accommodated in the vibration actuator in a mobile fashion such that the vibrating body can be brought into mechanical contact with the equalizing container.

The vibrating body can be moved in particular by a magnetic field that can be produced by the vibration actuator. Such a magnetic field can be produced for example by a wire winding, preferably by a cylinder coil, that surrounds the vibrating body, by passing an electric current through the wire winding or applying a voltage to the wire winding.

One of the previous exemplary embodiments or a further exemplary embodiment is preferably characterized in that the sound compensation apparatus comprises a vibration sensor designed to detect, measure or determine the sound waves in the working fluid of the working fluid circuit. In particular, the vibration sensor allows the frequency and/or absolute value of the sound waves in the working fluid to be detected, measured or determined. This allows the vibration actuator to be operated on the basis of the sound waves in the working fluid, increasing the possible sound compensation.

It is also preferable if the vibration sensor is arranged at a distance from the vibration actuator. This allows reciprocal influencing of the sensor and the actuator to be largely precluded.

In addition, it is advantageous if the vibration sensor is accommodated in the vibration actuator. In this way, the vibration sensor and the vibration actuator form a unit, which simplifies installation and manufacture, but also reduces the installation space required for the sound compensation apparatus. In order to avoid or at least reduce reciprocal influencing of the sensor and the actuator, it is preferred if the sensor and the actuator can be operated or are operated alternately or at staggered times.

It is furthermore advantageous if the vibration sensor is a piezoelectric vibration sensor. This creates a particularly compact vibration sensor.

One of the previous exemplary embodiments or a further exemplary embodiment is preferably characterized in that the sound compensation apparatus is designed in such a way that the vibration actuator can be operated or is operated on the basis of the sound waves detected, detectable, measured, measurable, determinable or determined by the vibration sensor. This allows vibrations that at least partially, largely or completely compensate for the sound waves in the working fluid to be selectively generated by the vibration actuator.

One of the previous exemplary embodiments or a further exemplary embodiment is preferably characterized in that the vibration actuator is designed in such a way that it can be operated as a vibration sensor. In this manner, the vibration actuator can be operated as an actuator and as a sensor alternately or at staggered times. It is advantageous that this does not require a separate vibration sensor to be provided, since the vibration actuator is capable of acting as a vibration sensor. In other words, it is preferred if the vibration actuator is the vibration sensor that is part of the sound compensation apparatus, since the vibration actuator can be operated as a vibration sensor. Examples of vibration actuators that are capable of being operated as a vibration sensor are piezoelectric vibration actuators or the vibration actuator mentioned previously that comprises a vibrating body. This vibrating body, made to vibrate by the sound waves in the working fluid, induces, by virtue of its movement, a voltage in the winding of the vibration actuator. The measurement of the voltage induced thereby, in particular using the voltage characteristic, can be used to determine the sound waves in the working fluid. In particular, the vibrating body is pretensioned against the equalizing container or the working fluid container, increasing measurement accuracy.

Within the context of the disclosure, in one preferred embodiment the vibration sensor is intended to be understood to mean a vibration sensor produced separately from the vibration actuator, while in a further preferred embodiment the vibration sensor is likewise intended to be understood to mean the vibration actuator, specifically if the vibration actuator is likewise operable, or operated, as a vibration sensor, in particular at staggered times.

One of the previous exemplary embodiments or a further exemplary embodiment is preferably characterized in that the sound compensation apparatus is designed to generate an acoustic passer-by warning signal and/or an acoustic animal dispelling signal. The two signals are preferably sound emissions whose volume and/or frequency is adapted in particular to the passers-by to be warned, the surroundings, the absolute value of the ambient sound level and/or the animal to be dispelled. It is particularly preferred if the vibration actuator generates the passer-by warning signal and/or the animal dispelling signal by using the equalizing container or the working fluid container as a resonating body. For this purpose, in particular the vibration actuator is operated at a frequency that corresponds to the resonant frequency of the equalizing container or the working fluid container. The resonant frequency is preferably determined beforehand by the vibration sensor. In particular if an electric vehicle or a hybrid vehicle comprises the sound compensation apparatus, the sound compensation apparatus is capable of using the passer-by warning signal to warn passers-by about the traveling vehicle that comprises the sound compensation apparatus, allowing traffic accidents with passers-by and cyclists to be reliably avoided. It is particularly preferred if the passer-by warning signal can be generated on the basis of location data, in particular GPS data, direction of travel of the vehicle, ambient sensors and/or the speed of travel. As such, it is possible for example for the passer-by warning signal to be generated only in built-up areas or at speeds of travel of no more than 60 km/h, 50 km/h, 30 km/h or 10 km/h. The ambient sensors allow the passer-by warning signal to be generated only if there are passers-by in the surroundings of the vehicle. The dependency on the direction of travel of the vehicle allows the passer-by warning signal to be generated only if the vehicle is reversing. It is also preferable if the animal dispelling signal can be generated only if the vehicle is at a standstill. This prevents damage to the vehicle by animals, for example martens, by virtue of the animal dispelling signal being emitted at a frequency and/or volume that is specific to the animal and dispels the animal to be dispelled. All of the aforementioned conditions relating to the generation of the signals can be applied to the method for sound emission that is mentioned later.

The object relating to the vehicle is achieved by providing a vehicle having at least one sound compensation apparatus according to the invention. It is preferred if the vehicle is a rail vehicle, for example a train. It is particularly preferred if the vehicle is a motor vehicle. Furthermore, it is preferred if the vehicle is a truck or a passenger car. It is also preferred if one of the aforementioned vehicles is a hybrid vehicle or an electric vehicle. A hybrid vehicle is intended to be understood to mean a vehicle that comprises both an electric motor drive and an internal combustion engine drive, for example an electric motor and an internal combustion engine. An electric vehicle is intended to be understood to mean a vehicle that has just an electric motor drive, for example an electric motor.

It is also preferable if one of the aforementioned vehicles is equipped both with a sound compensation apparatus according to one aspect of the invention for compensating for sound waves in the coolant and with a sound compensation apparatus according to one aspect of the invention for compensating for sound waves in the refrigerant. In addition, it is advantageous if one of the two sound compensation apparatuses is operated using one of the methods that follow, while the other sound compensation apparatus is operated using another of the methods that follow. It is also conceivable for both sound compensation apparatuses to be operated using the same method, specifically one of the methods that follow. This provides a particularly quiet and safe vehicle.

A further aspect of the invention relates to a machine tool, in particular having a cooling system, that is equipped with such a sound compensation apparatus. This creates a machine tool that is distinguished by a particularly low sound level burden. In particular, the sound composition apparatus relates to the cooling system.

A further aspect of the invention relates to a building having an air conditioning system that is equipped with a sound compensation apparatus according to the invention. This provides a building that is distinguished by a particularly low sound level burden from the air conditioning system.

The object relating to the method for sound compensation is achieved by providing a method for sound compensation by an apparatus according to the invention. The apparatus according to the invention is in particular the vehicle according to the invention, the sound compensation apparatus according to the invention, the building or the machine tool.

One of the previous exemplary embodiments or a further exemplary embodiment is preferably characterized in that the method for sound compensation comprises the step of using the apparatus according to the invention to produce destructive interference in order to at least partially compensate for sound waves in the working fluid. This preferably compensates for, reduces or eliminates a large portion or at least some of the sound waves in the working fluid.

The object relating to the method for sound emission is achieved by a method for sound emission that is carried out by an apparatus according to the invention. The apparatus according to the invention is in particular the vehicle according to the invention, the sound compensation apparatus according to the invention, the building or the machine tool. It is also preferred for the passer-by warning signal and/or the animal dispelling signal to be generated by the apparatus. This allows passers-by to be warned and/or animals to be dispelled. It is particularly preferred if these signals are generated on the basis of at least one, multiple or all of the aforementioned conditions.

A further aspect of the invention relates to a method for measuring a working fluid level in the equalizing container. For this purpose, a sound signal is generated by the vibration actuator of the sound compensation apparatus and then the vibration signal prevailing in the equalizing container or working fluid container is measured by the vibration sensor. The measurement can be used to determine the working fluid level in the equalizing container or in the working fluid container, since the signal to be measured is dependent on the working fluid level therein. Alternatively or additionally, the sound compensation apparatus determines a resonant frequency of the equalizing container or of the working fluid container, resulting in the working fluid level in the equalizing container or working fluid container being inferred. In particular, the working fluid level is determined by comparing the determined resonant frequency with a previously known resonant frequency that is in particular stored on a control unit, the previously stored resonant frequency being associated with a specific working fluid level. In particular, the association of the resonant frequency with a working fluid level can be experimentally ascertained when designing a working fluid circuit and a sound compensation apparatus.

A further preferred aspect of the invention is characterized in that one of the methods described above comprises gradually increasing the frequency of the vibration of the vibration actuator. This preferably involves frequency steps of 50, 100, 250, 500, 1000 hertz or more. Irrespective of this, it is preferred if the sound in the working fluid is measured by the vibration sensor after a or each gradual increase. The frequency is preferably increased until a minimum value or a maximum value for the sound wave intensity in the working fluid is reached.

BRIEF DESCRIPTION OF THE DRAWINGS

The text that follows explains the invention in detail on the basis of exemplary embodiments with reference to the drawings, in which.

DETAILED DESCRIPTION OF THE PREFERRED EMBODIMENTS

Figure 1:
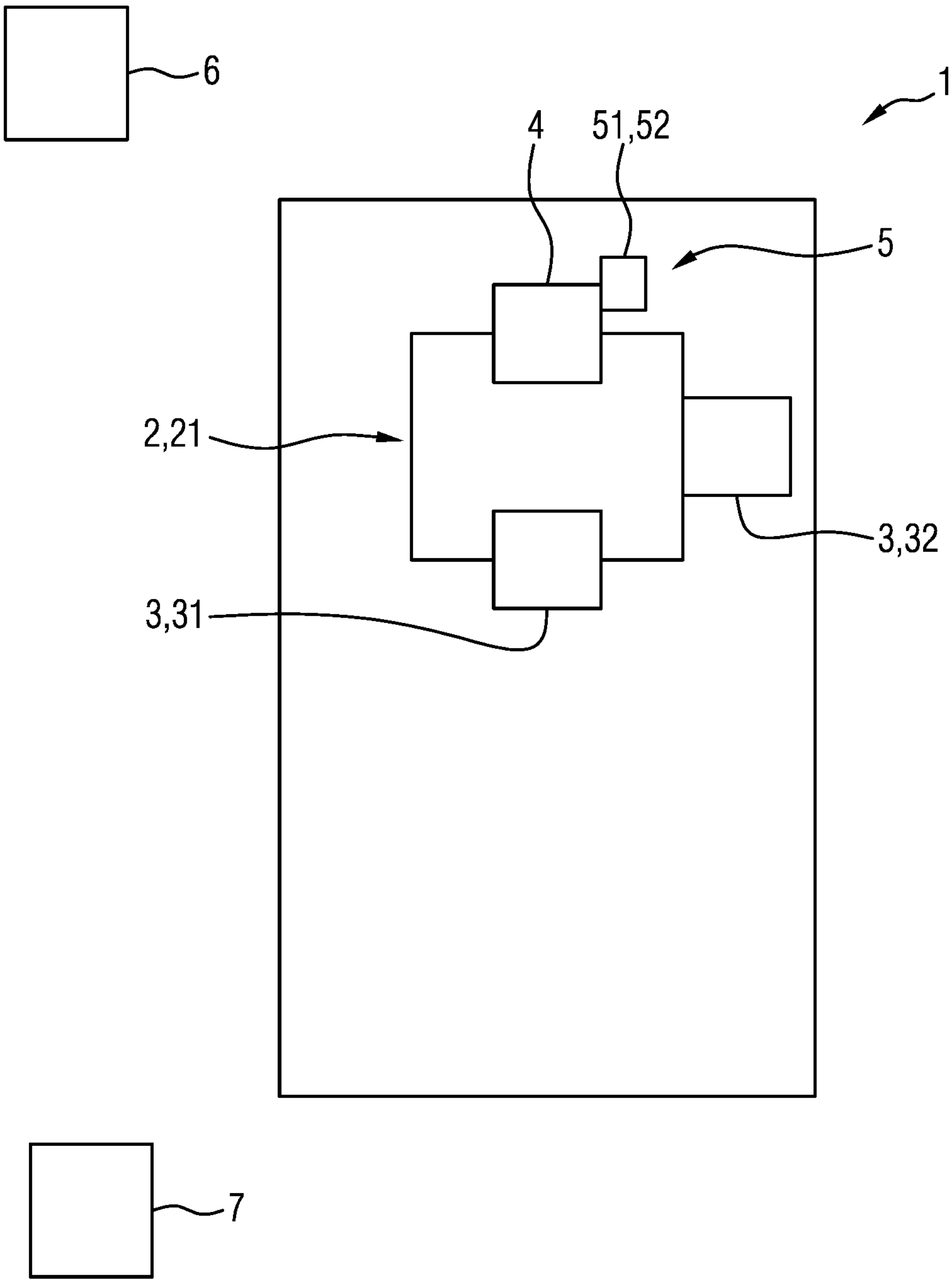
FIG. 1 is a vehicle.

FIG. 1 shows a vehicle 1. This is an electric vehicle having an electric machine 3, which is a traction motor 32. The traction motor is a permanent-field synchronous machine. The vehicle 1 comprises a working fluid circuit 2, which is in the form of a coolant circuit 21. The coolant in the coolant circuit 21 is conveyed by an electric coolant pump 31 driven by an electric machine 3. The coolant circuit 21 comprises an equalizing container 4. The equalizing container 4 has a sound compensation apparatus 5 arranged on it, which comprises a vibration actuator 51 and is coupled to the equalizing container 4 for vibration transmission purposes. The equalizing container 4 is produced from a plastic. The vibration actuator 51 comprises a housing made from plastic and is cohesively joined to the equalizing container 4 by a weld joint. The vibration actuator 51 is designed in such a way that it can likewise be operated as a vibration sensor 52. It is a piezoelectric actuator. The vibration sensor 52 can measure sound waves in the working fluid of the working fluid circuit 2. The sound waves are caused by vibrations of the electric machines 3. The vibration actuator 51 can be used to make the working fluid of the working fluid circuit 2 vibrate in such a way that the sound waves in the working fluid of the working fluid circuit 2 are at least partially, largely or completely compensated for. Instead of carrying out sound compensation, it is also possible to perform sound emission by the sound compensation apparatus 5. This involves using the equalizing container 4 as a resonating body, in order to generate an acoustic passer-by warning signal to warn passers-by 6 who are in the surroundings of the traveling vehicle 1. Alternatively, it is possible to generate an acoustic animal dispelling signal in order to dispel animals 7 that are in the surroundings of the parked vehicle 1. The traction motor also comprises a cooling jacket that forms a working fluid circuit section of the working fluid circuit 2 and is therefore coupled to the working fluid circuit 2 for heat transfer purposes.

Figure 2:
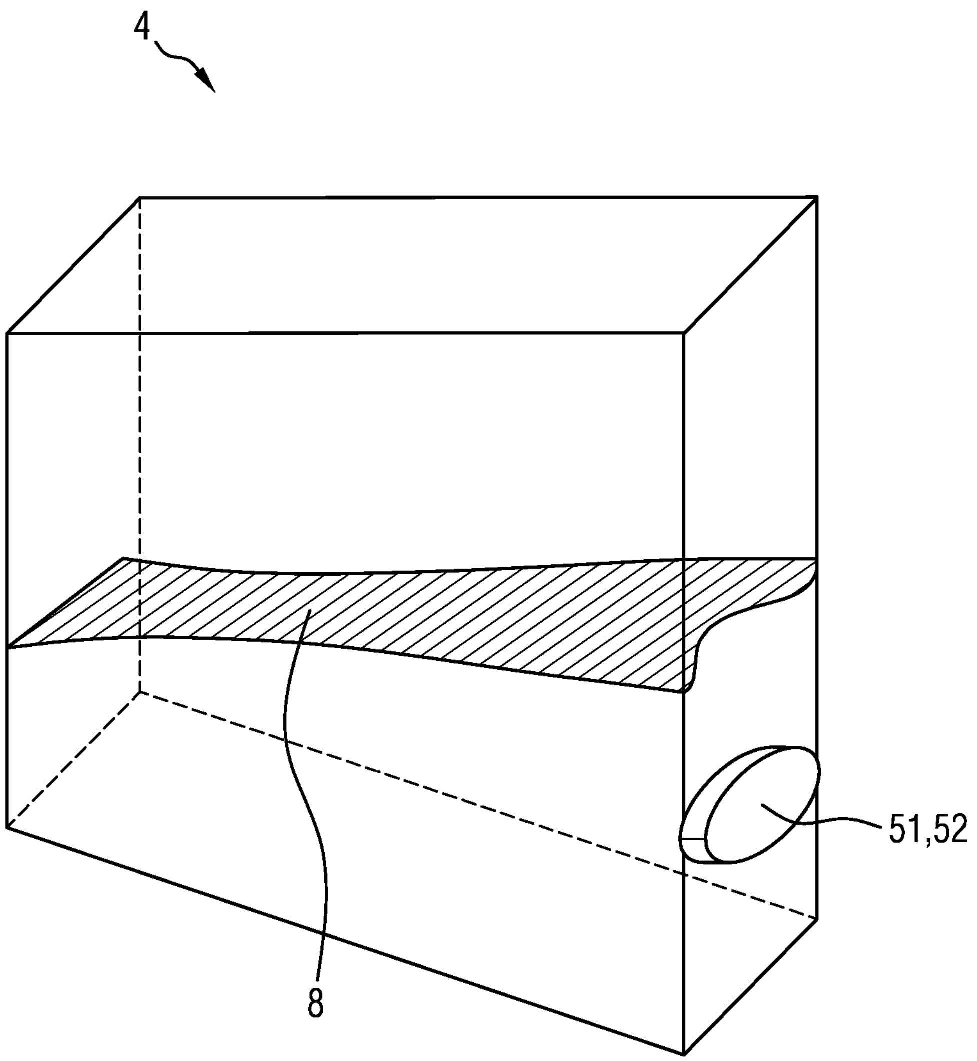
FIG. 2 is a sound compensation apparatus.

FIG. 2 shows the equalizing container 4 from FIG. 1 with a vibration actuator 51 that can also be used as a vibration sensor 52. Generating a sound signal by way of the vibration actuator 51 of the sound compensation apparatus 5 and subsequently evaluating the vibration signal by the vibration sensor 52 can also be used to determine the working fluid level 8 in the equalizing container 4.

Figure 3:
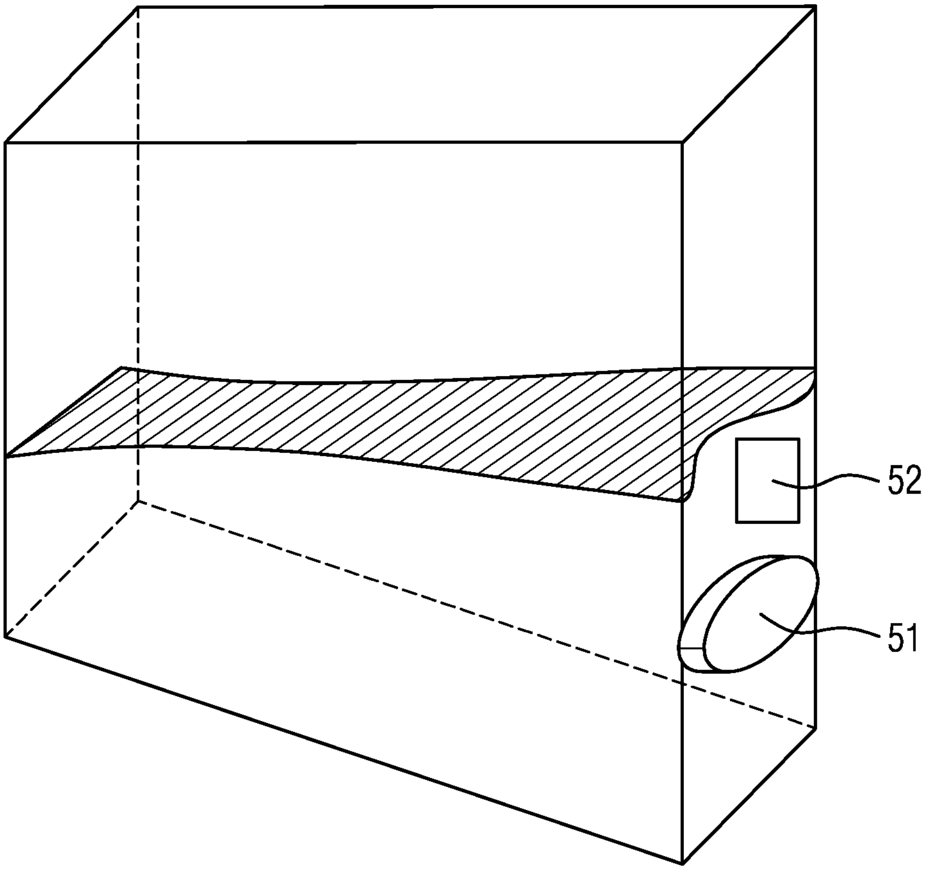
FIG. 3 is a sound compensation apparatus.

FIG. 3 likewise shows an equalizing container 4, but differs from the embodiment in FIG. 2 in that the sound compensation apparatus comprises a separate vibration sensor 52 arranged at a distance from the vibration actuator 51.

The different features of the individual exemplary embodiments can also be combined with one another.

The exemplary embodiments in FIGS. 1 to 3 have in particular no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sound compensation apparatus comprising:

a working fluid circuit through which a working fluid flows and configured to cool with the working fluid; and a single actuator configured as a vibration actuator configured to:

at least partially compensate for sound waves in the working fluid and operate as a vibration sensor to measure the sound waves in the working fluid, wherein the working fluid circuit comprises:

an equalizing container for the working fluid and/or a working fluid container for the working fluid, wherein the vibration actuator is mounted directly to a respective working fluid retaining wall of the equalizing container or to the working fluid container, wherein the vibration actuator is configured to alternately operate as the vibration actuator and the vibration sensor, and wherein the equalizing container and/or the working fluid container is a resonating body for the vibration actuator.

2. The sound compensation apparatus as claimed in claim 1, further comprising an electric machine.

3. The sound compensation apparatus as claimed in claim 1, wherein the working fluid circuit comprises at least one working fluid circuit section configured to cool one or more of:

a battery, a battery housing, an inverter, an electric machine, an electric motor, power electronics, and a battery charging system.

4. The sound compensation apparatus as claimed in claim 3, wherein the electric machine comprises a cooling jacket that forms one of the at least one working fluid circuit section or a further working fluid circuit section of the working fluid circuit.

5. The sound compensation apparatus as claimed in claim 1, wherein the vibration actuator is an electromechanical vibration actuator.

6. The sound compensation apparatus as claimed in claim 1, wherein the vibration sensor is implemented by the vibration actuator and is configured to detect the sound waves in the working fluid of the working fluid circuit.

7. The sound compensation apparatus as claimed in claim 1, wherein the sound compensation apparatus is configured such that the vibration actuator can be operated based on the sound waves detected by by the vibration actuator operating as the vibration sensor.

8. The sound compensation apparatus as claimed in claim 1, wherein the sound compensation apparatus is configured to generate a passer-by warning signal and/or an animal dispelling signal.

9. The sound compensation apparatus as claimed in claim 6, wherein the detected sound waves in the working fluid are used to determine a fluid level in the equalizing container or to the working fluid container.

10. The sound compensation apparatus as claimed in claim 1, wherein the vibration actuator is operated as a function of the sound waves detected by the vibration sensor, and wherein the at least partial compensation of sound waves in the working fluid is destructive interference.

11. The sound compensation apparatus as claimed in claim 1, wherein the equalizing container and/or the working fluid container is a resonating body for the vibration actuator.

12. The sound compensation apparatus as claimed in claim 1, wherein the vibration actuator is arranged inside or outside the equalizing container and/or the working fluid container.

13. The sound compensation apparatus as claimed in claim 1, wherein the equalizing container is produced from a plastic and the vibration actuator comprises a housing made from plastic that is cohesively joined to the equalizing container.

14. The sound compensation apparatus as claimed in claim 1, wherein the single actuator is a piezoelectric actuator.

15. A vehicle having at least one sound compensation apparatus comprising:

a working fluid circuit through which a working fluid flows and configured to cool with the working fluid; and a single actuator configured as a vibration actuator configured to at least partially compensate for sound waves in the working fluid and operate as a vibration sensor to measure the sound waves in the working fluid, wherein the working fluid circuit comprises:

an equalizing container for the working fluid and/or a working fluid container for the working fluid, wherein the vibration actuator is mounted directly to a respective working fluid retaining wall of the equalizing container or to the working fluid container to at least partially compensate for the sound waves in the working fluid, wherein the vibration actuator is configured to alternately operate as the vibration actuator and the vibration sensor, and wherein the equalizing container and/or the working fluid container is a resonating body for the vibration actuator.

16. A method for sound compensation by an apparatus having a working fluid circuit through which a working fluid flows and configured to cool with the working fluid; and a single actuator configured as a vibration actuator configured to at least partially compensate for sound waves in the working fluid and operate as a vibration sensor to measure the sound waves in the working fluid, wherein the working fluid circuit comprises: an equalizing container for the working fluid and/or a working fluid container for the working fluid, wherein the vibration actuator is coupled to the equalizing container or to the working fluid container, wherein the equalizing container and/or the working fluid container acts as a resonating body for the vibration actuator, comprising:

sensing vibration via the vibration actuator configured to at least partially compensate for sound waves in the working fluid using the equalizing container or the working fluid container acting as the resonating body and operate as a vibration sensor; and producing destructive interference to at least partially compensate for sound waves in the working fluid using the equalizing container or the working fluid container acting as the resonating body by the vibration actuator.

17. The method for sound compensation according to claim 16, further comprising:

measuring a vibration signal emitted by the vibration actuator in the equalizing container or the working fluid container using the vibration actuator operating as a vibration sensor; and determining a working fluid level in the equalizing container or the working fluid container based on the measured vibration signal.

* * * * *